(12) United States Patent
Russ

(10) Patent No.: US 9,155,291 B1
(45) Date of Patent: Oct. 13, 2015

(54) TIME RELEASE BAIT CANNISTER

(71) Applicant: Mullins Russ, Ferndale, WA (US)

(72) Inventor: Mullins Russ, Ferndale, WA (US)

(*) Notice: Subject to any disclaimer, the term of this patent is extended or adjusted under 35 U.S.C. 154(b) by 98 days.

(21) Appl. No.: 13/903,194

(22) Filed: May 28, 2013

(51) Int. Cl.
*A01K 97/02* (2006.01)

(52) U.S. Cl.
CPC .................................... *A01K 97/02* (2013.01)

(58) Field of Classification Search
CPC ........................................................ A01K 97/02
USPC .................................. 43/44.99, 42.06, 43.12
See application file for complete search history.

(56) References Cited

U.S. PATENT DOCUMENTS

| | | | |
|---|---|---|---|
| 2,729,912 A * | 1/1956 | Moffett | 43/44.99 |
| 3,426,472 A | 2/1969 | Richard | |
| 3,724,120 A * | 4/1973 | Richard | 43/100 |
| 3,842,529 A | 10/1974 | Richard | |
| 4,143,479 A | 3/1979 | Kingston | |
| 4,914,856 A | 4/1990 | Kennedy | |
| 5,617,669 A | 4/1997 | Levey | |
| 6,138,400 A * | 10/2000 | Gervae | 43/44.99 |
| 6,453,602 B1 * | 9/2002 | Russell et al. | 43/100 |
| 6,711,849 B1 * | 3/2004 | Moretti | 43/44.99 |
| 2009/0255164 A1 * | 10/2009 | Jones | 43/4.5 |

FOREIGN PATENT DOCUMENTS

| | | | |
|---|---|---|---|
| GB | 2126061 | * | 3/1984 |
| GB | 2196821 | * | 5/1988 |
| GB | 2226743 | * | 11/1990 |
| GB | 2359473 B | | 4/2004 |

* cited by examiner

*Primary Examiner* — Darren W Ark
*Assistant Examiner* — Magdalena Topolski
(74) *Attorney, Agent, or Firm* — Michael J. Tavella

(57) ABSTRACT

A timed-release bait container that has an inner bait container with small openings formed in it. The inner container is inserted into an outer housing and sealed with an elastomeric band and a galvanic couple. The elastomeric band holds the inner bait container and the outer housing together. A rubber gasket creates a watertight seal between the inner bait container and the outer housing keeping the selected bait dry and fresh. A pressure equalization hole is covered until the galvanic couple breaks, allows the container's internal pressure to equalize with the external pressure. Once pressure equalization has occurred, the inner bait container is pulled out of the outer housing allowing exposure of the fresh bait to the sea. The small holes in the inner bait container prevent target species from depleting the bait and prevent the entry of sea lice, thereby keeping the bait fresh for as long as possible.

10 Claims, 6 Drawing Sheets

TIME RELEASE BAIT CANNISTER

CROSS REFERENCE TO RELATED APPLICATIONS

This application claims benefit of provisional application 61/653,028 filed May 30, 2012.

STATEMENT REGARDING FEDERALLY SPONSORED RESEARCH AND DEVELOPMENT

Not Applicable

BACKGROUND OF THE INVENTION

1. Field of the Invention

The invention is in the technical field of fishing equipment. More particularly, the invention is in the technical field of delayed release bait containers that are intended for use in fish and shellfish fisheries.

2. Description of the Prior Art

Today, generally, crustaceans such as lobsters, crabs and shrimp, are caught with baited traps. In addition, large numbers of fish, such as sablefish and other bottom fish, are caught in baited traps or pots. Crustaceans and fish are attracted to, and lured within, the pots by the odor of bait, which usually comprises a food substance preferred by the particular targeted animal. Typically, fish or shellfish byproducts are used as bait; however manufactured baits are sometimes used. Bait can be hung within the pot, or it can be held in bait containers that allow the odor of the bait to escape. Two problems with such systems exist. First, as soon as bait is exposed to water, the attractive odor substances contained within the bait begin to quickly leach out. Because the quantity of bait is limited in a pot, the effectiveness of baited pots lasts for a relatively short period after the pot is deployed in the sea. Second, bait left hanging free, or bait in containers with large holes in them, allow sea creatures, such as sea lice to enter the container and eat the bait quickly. As a result, much of the effort and expense of pot fishing involves the frequent renewal of bait. Generally, re-baiting is necessary long before an adequate catch has accumulated. It has been recognized, therefore, that if fresh bait replacement can be delayed, avoiding the expenditure of labor and boat operating time, the actual catch per unit effort, and hence the profitability, of the fishing operation can be significantly increased.

To that end, several devices for holding bait have been developed. Examples of such devices are found in following U.S. Patents: U.S. Pat. No. 4,914,856 discloses a trap made of plastic that has a door for loading and a number of slits formed in it. The device can be loaded and suspended in a pot and released into the sea. While an improvement over hanging the bait openly, the slits allow water and some organisms to enter immediately, thus shortening the effective life of the bait. U.S. Pat. No. 5,617,669 is another example of a simple container for holding bait that does little to protect the bait from rapid exhaustion.

Others have developed systems for time-release of the bait. In this way, the bait is kept in a container and not opened for a set time. After a desired interval, the container is opened and the bait is allowed to mix with the seawater. Such devices allow for a prolonging of the bait for an extended time. Examples of these devices include: U.S. Pat. No. 4,143,479, which teaches a sealed bag that is held in a frame. A knife blade is secured to a track and is held by a restraint. The restraint is designed to dissolve in seawater after a given time. Once the restraint fails, the knife blade is pulled along the track and the bag is opened. While novel, this system has a number of drawbacks. First, the knife blade has a high potential of failure. Second, the device is difficult and perhaps dangerous to operate and configure with gloves and in typical fishing environments. Lastly, if the bag is successfully opened, target species and other organisms can quickly consume the bait, as there is no mechanism that prevents access to the bait. U.S. Pat. No. 6,453,602 teaches a canister that has a door for loading and exposing the bait. The door is biased open by an elastic cord that is restrained by a corrodible link. Because the container is not water tight, bait is immediately exposed to seawater, which leads to immediate degradation of the bait prior to release of the corrodible link. Once the link corrodes, the lid is released and the bait is further exposed to the seawater. Once the door is open, however, this device is no better than simply hanging the bait fully exposed. As such, the bait does not last long once the container is opened. U.S. Pat. No. 3,842,529 teaches a number of methods of using corrodible materials to hold bait and release it after a desired time has elapsed. In one most embodiment, he teaches containers that have corrodible lids or a bag with a corrodible clip that, once corroded expose the bait. The problem with these designs is, one again, once the container is opened, the bait is fully exposed to seawater and organisms and sea water is allowed to leak into the container prior to the container being opened leading to significant premature bait degradation Finally, a UK patent, GB 2,359,473 teaches another container that is sealed after loading. A time-release mechanism is installed to cause the seal to open, exposing the bait. This too suffers from the problem of having large holes that permit seawater and organisms to enter the container and rapidly deteriorate the bait after the time-release function has worked.

BRIEF DESCRIPTION OF THE INVENTION

The instant invention overcomes these difficulties. The device consists of an inner bait container that has a number of small openings formed in it. The inner bait container is inserted into an outer housing. An elastomeric band, which has an eye at one end, is attached to one end of a galvanic couple. The other end of the galvanic couple has an eye that is placed over a post attached to the outer housing. The other end of the elastomeric band is hooked over a tab on the outer housing after passing over the inner bait container. The elastomeric band effectively holds the inner bait container and the outer housing securely together. In this way, the bait container can be placed in the water and the bait is completely sealed from seawater exposure. Once inserted into the sea, the galvanic couple begins to corrode. After user-determined period of time, the galvanic couple breaks and the elastomeric band detaches from the device. Once this happens, a pressure equalization hole is exposed, which allows the container's internal pressure to equalize with the external pressure. Once pressure equalization has occurred, the inner bait container is pulled out of the outer housing, either by the elastomeric cords or by gravity, allowing exposure of the fresh bait to the sea. Note that the outer housing is not separated from the inner bait container because of a length of non-elastomeric twine or rope or other means. Once the device is deployed, the bait is exposed to seawater and immediately begins to attract target species. Target species and other organisms, such as sea lice, are generally prevented from accessing the bait, thereby extending the life of the bait for an extended time.

DETAILED DESCRIPTION OF THE INVENTION

Figure 1:
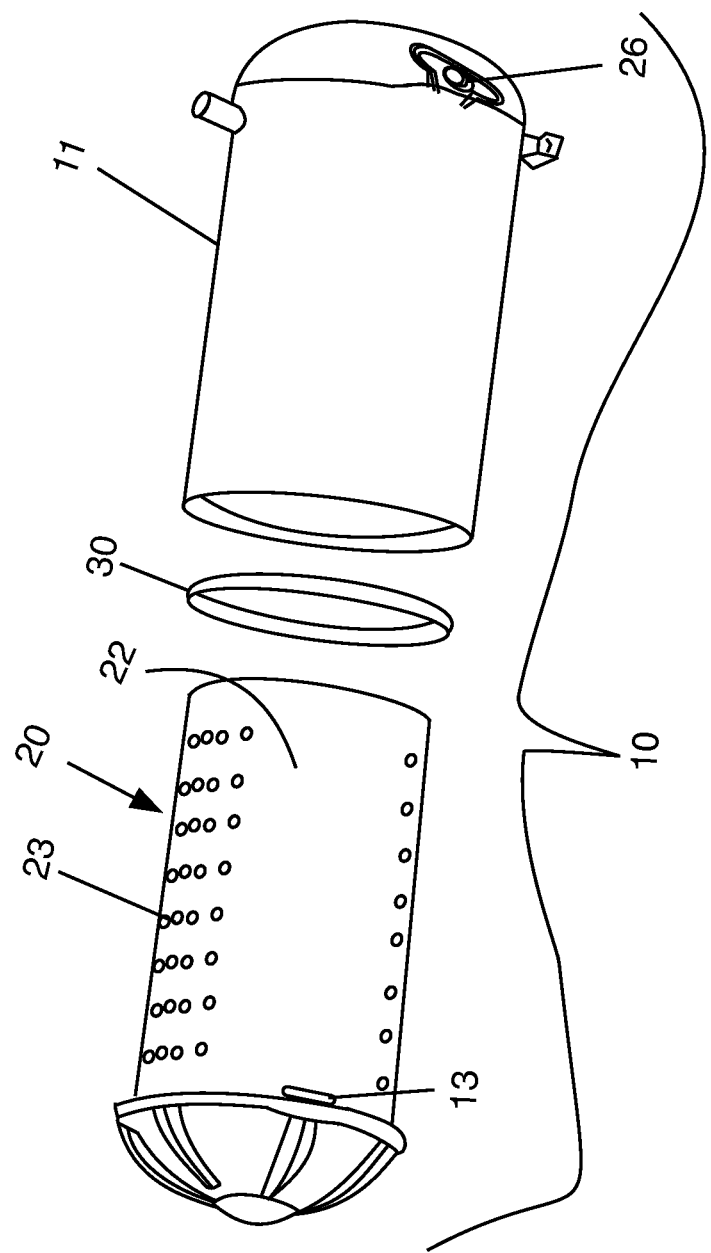
FIG. 1 is a view of the housing components of invention disassembled.
Figure 2:
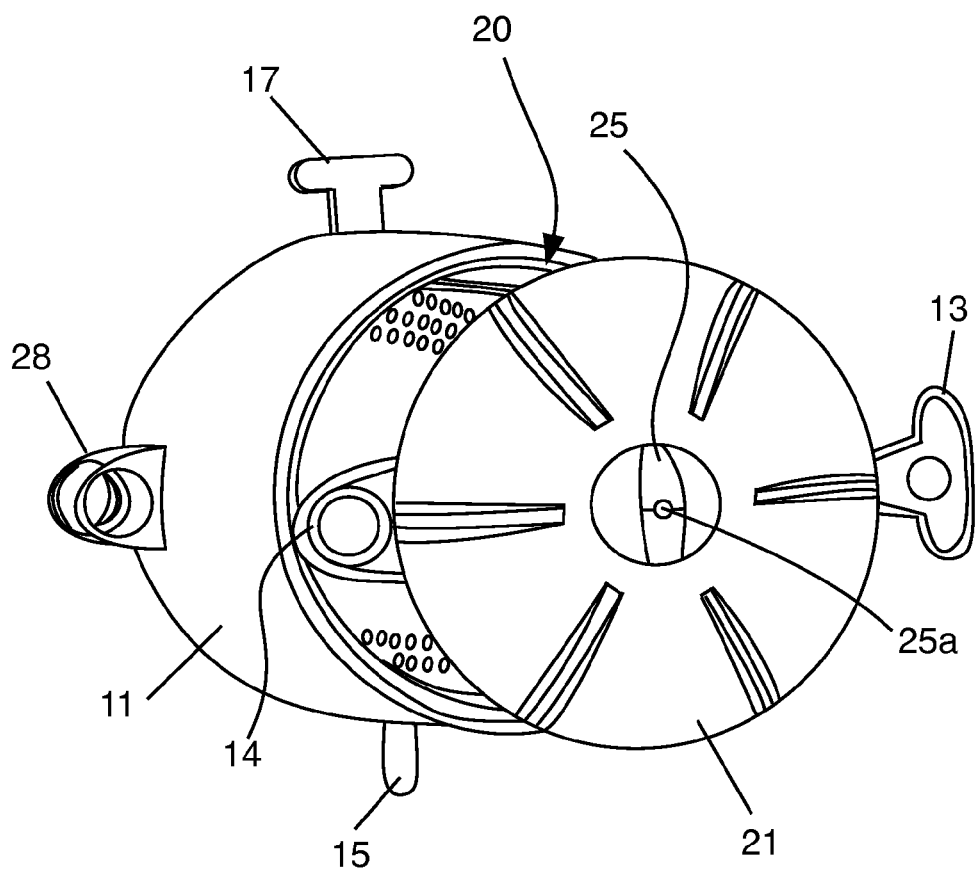
FIG. 2 is a perspective view of top portion of the inner bait container with the bait container deployed.
Figure 3:
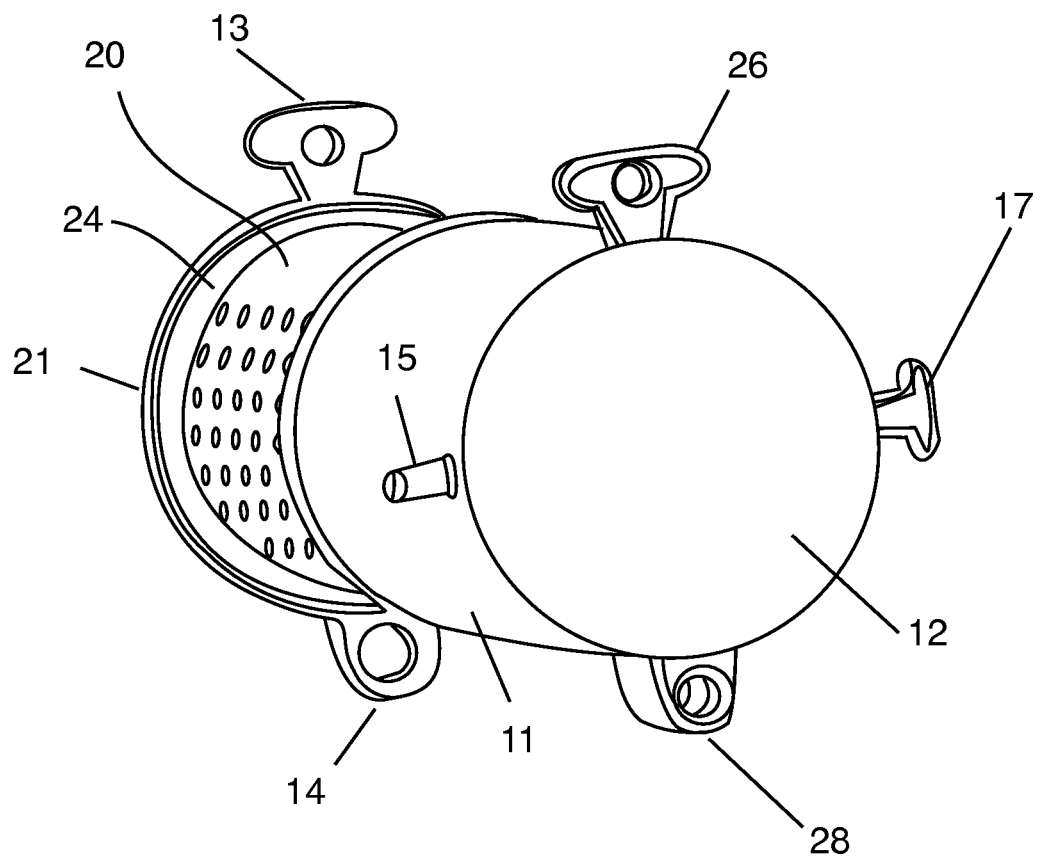
FIG. 3 is a perspective view of the top portion of the outer housing with the inner bait container deployed.

As a matter of convenience, this invention will be described with reference to fish and shellfish fishing using traps commonly known as pots, though it is not limited thereto. Referring now to the drawings and particularly to FIGS. 1, 2 and 3 the invention 10 consists of an outer housing 11 and inner bait container 20 constructed from plastic materials such as ABS or PVC. The outer housing 11 is cylindrical in shape with a solid, hemispherical cap 12 of the same diameter on one end. The inner bait container 20 is also cylindrical in shape with a hemispherical cap 21 of the same diameter on one end. Both components are hollow with outer walls that are of sufficient thickness to withstand water pressures at extreme depths when sealed. The hemispherical cap 21 of the inner container is the same diameter as the outer housing 11. The hollow cylinder 22 of the inner bait container 20 is of smaller diameter that the outer housing 11 so that it can be freely inserted into the open end of the outer housing 11 to the point where the outer housing meets the lip 24 (see FIG. 3) on the inner hemispherical cap 21 of the bait container. The hollow cylinder 22 of the inner bait container extends from the hemispherical cap 21 for some distance. The cylinder 22 has numerous perforations 23, as small holes or slits that allow the scent of the bait to escape the container. Bait (not shown) is stored in the hollow cylinder 22. In the preferred embodiment, the holes are 2 mm in diameter. This allows water to enter, but prevent sea lice, which range from 0.25 cm to 1.25 cm in length.

A rubber gasket or "O" ring 30 is attached to the cylinder 23 of the inner bait housing to create a water-tight seal between the inner bait container and the outer housing when the device is assembled. Once deployed in the sea, water pressure causes an increasingly tight seal. This can be considered as a means for sealing between the inner container and the outer housing. See, e.g., FIG. 3.

Referring now to FIG. 2, the hemispherical end 21 of the inner bait container 20 has a groove or channel 25 that runs through the center of the hemispherical cap 21 that retains an elastomeric band 32 (see, e.g., FIG. 4) under tension. The hemispherical cap 21 of the inner bait container also has a small pressure equalization hole 25a, also known as a means for equalizing pressure, that is tightly covered and sealed by the elastomeric band 32 while it is under tension, before deployment. The perimeter of the pressure equalization hole is raised slightly to form a more dependable and foolproof seal. Once sealed, bait is kept dry and fresh inside the invention until is deployed, as discussed below.

FIGS. 2 and 3 show additional features present on both the outer housing and the inner bait container. On both the hemispherical cap 21 of the bait container and the hemispherical cap 12 of the outer housing has ears 13 and 26 respectively. These ears are used to hold elastic cords used in one method of deployment as shown in FIG. 4 and as discussed below.

Figure 5:
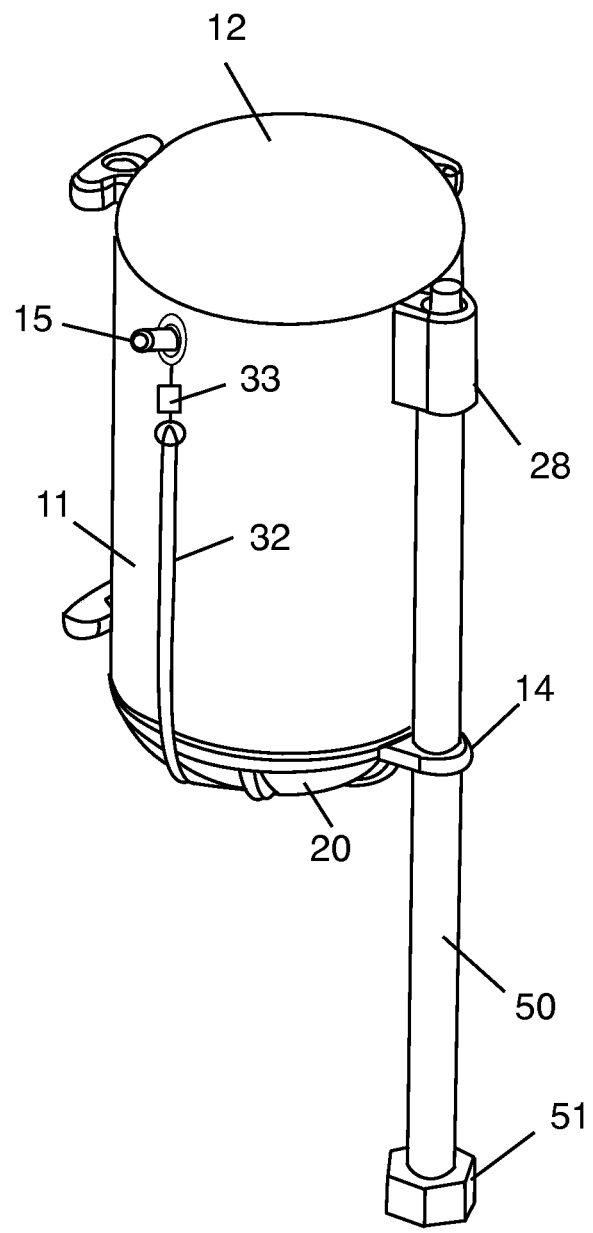
FIG. 5 is a perspective view of the invention using the fixed mounting rod suspension with the bait container ready to deploy the bait container.
Figure 6:
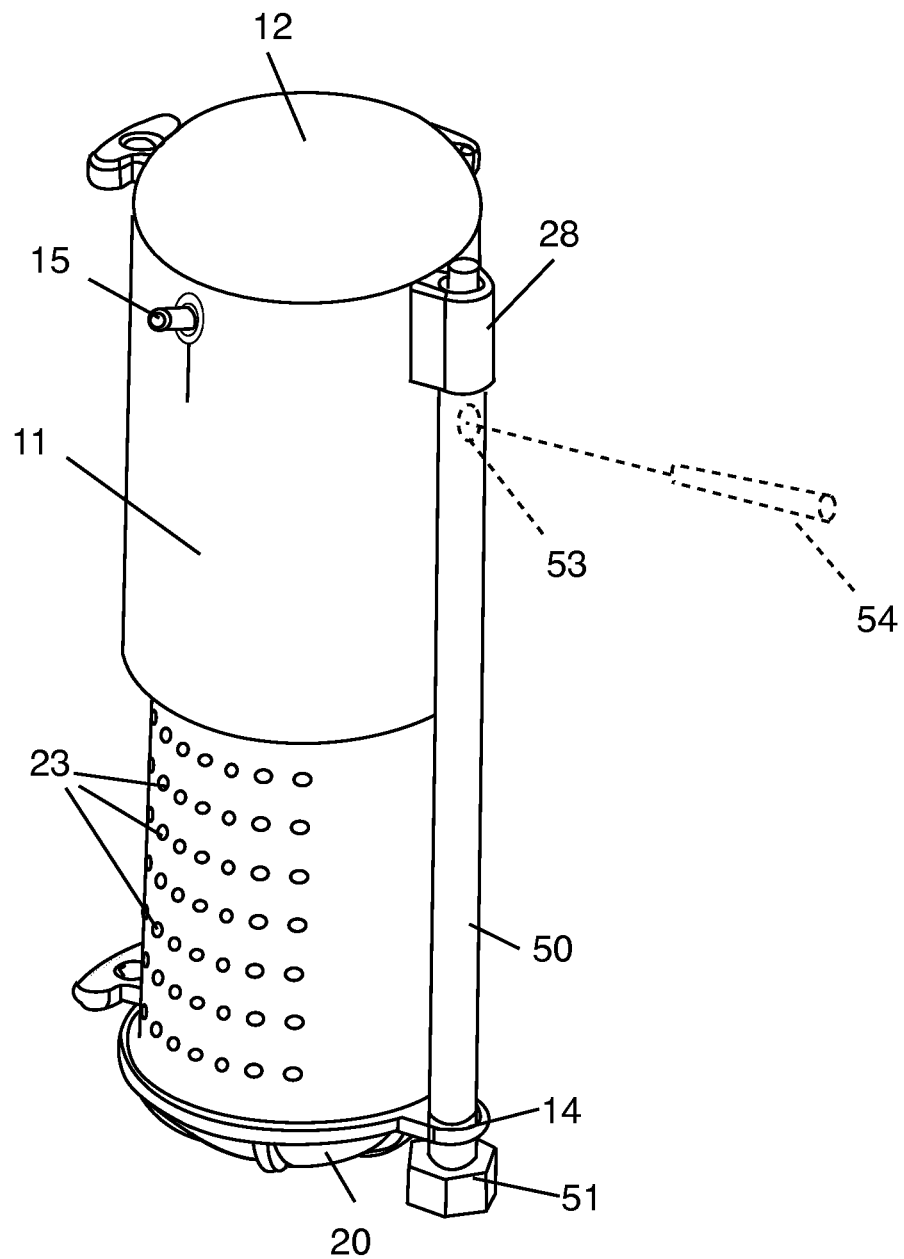
FIG. 6 is a perspective view of the invention using the fixed mounting rod suspension with the bait container deployed.

The end cap 21 has an eye 14 and the outer housing 11 has a tube 28, which are used in the second method of deployment, as shown in FIGS. 5 and 6 and as discussed below. In addition, near the hemispherical cap 12 of the outer housing also has a small post 15 that is used to hold a cord that is attached to a galvanic couple 33, as discussed below. Opposite the small post 15 on the hemispherical cap 12 is a tab 17 that is used to secure the end of the elastomeric band 32 on the device prior to the inner bait container being deployed when the galvanic couple 33 releases, as discussed below. The combination of the small post 15, tab 17, the elastomeric band 32 and the galvanic couple 33 can be considered as a means for releasing the inner bait container on a time-release basis, attached to the bait canister to release the inner container from the outer housing after a defined interval.

Figure 4:
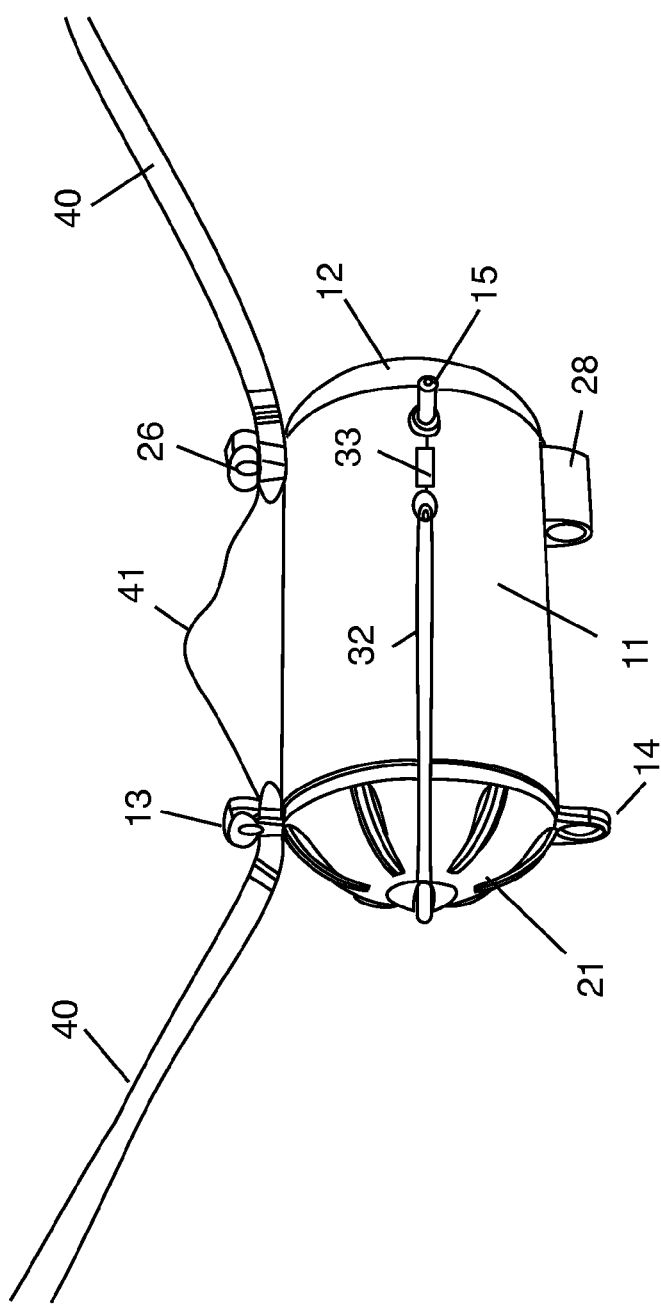
FIG. 4 is a side view of assembled invention deployed in a horizontal configuration using semi-permanent suspension component.

FIG. 4 is a side view of assembled invention deployed in a horizontal configuration using semi-permanent suspension components, which is one of two different ways to deploy the device. As shown in FIG. 4, a semi-permanent suspension mechanism is used that that consists of two elastomeric cords 40 that are approximately 18" long. One end of each cord is doubled over and secured so that a 0.5" eye is formed in the cord. The other end of each cord has a small plastic or stainless steel hook (not shown) attached. A short length of non-elastomeric twine or rope 41 connects the two eyes of the elastomeric cords to form one suspension mechanism. The length of the non-elastomeric twine is the same as the desired distance that the inner component will slide out of the outer component upon release of the galvanic couple 33. This feature prevents the outer and inner components from separating entirely once the galvanic couple releases and the device opens. In use, the suspension mechanism is placed inside a pot as desired with the hook on each end being secured to the web or framing on opposite sides of the pot. The suspension mechanism will not normally be removed from the pot as the device is re-baited by the user.

To deploy the device, a quantity of bait (not shown) is inserted into the inner bait container 20. The inner bait container 20 is then inserted into the outer housing 11 outer housing 11. Note that the "O" ring 30 is in place on the inner bait container 20. The elastomeric band 32, which has an eye at one end, is attached to one end of the galvanic couple 33. The other end of the galvanic couple has another eye that is placed over the post 15 as shown. The other end of the elastomeric band 32 is hooked over the tab 17. The elastomeric band 32 now effectively holds the inner bait container 20 and the outer housing 11 securely together. The eyes in the elastomeric cords 40 are then hooked over the tabs 13 and 26 on the inner bait container 20 and the outer housing 11 respectively. This process allows for quick, simple and efficient removal and re-deployment of the device throughout the baiting and re-baiting process. The design of the device allows for easy manipulation with adverse sea conditions and when the user is wearing work gloves. Old bait is easily removed from the inner component and cleaning, if necessary, can be done with a simple household brush or pressurized water. Moreover, as the depth of deployment increases, so will the compression of the gasket or 'O' ring.

Once inserted into the sea, the galvanic couple 33 begins to corrode. After a user-selected period of time, the galvanic couple 33 breaks and the elastomeric band detaches from the device. Once this happens, the pressure equalization hole 25a, in end cap 21, is exposed, which allows the container's internal pressure to equalize with the external pressure. Once pressure equalization has occurred, the inner bait container 20 is pulled out of the outer housing 11 by the elastomeric cords 40 or gravity, allowing exposure of the fresh bait to the sea.

Note that the outer housing is not separated from the inner bait container because of the non-elastomeric twine or rope 41.

Once the device is deployed, seawater is allowed to pass through and organisms, such as sea lice, are generally prevented from accessing the bait.

Referring now to FIGS. 5 and 6, the second method for deploying the device is shown. FIG. 5 is a perspective view of the invention using the fixed mounting rod suspension with the bait container ready to deploy the bait container. In this embodiment, a customized permanently or semi-permanently mounted stainless steel rod 50 is secured within a pot (not shown). The rod 50 is to use to hold the device in place within the pot. Typically, pots have two or more large steel weight-bars running across the bottom of the pot. These weight-bars are welded to the perimeter framing of the pot. The mounting rod 50 is welded directly onto a weight-bar or is threaded onto a stainless steel bolt 51 that is welded to the weight-bar. The stainless steel bolt can thus be considered as a means for attaching said tapered rod to a fishing pot. The mounting rod is oriented vertically in the pot and positioned so that it can be easily accessed when the pot door is opened.

When the device is used with the mounting rod 50, both the inner bait container 20 and the outer housing 11 are secured to the rod 20 by the eye 14 and tube 28 that keep the device properly oriented on the guide rod as shown. The diameter of the eye 14 on the inner bait container 20 is slightly larger than the guide tube 28 on the outer housing 11. The guide rod 50 has a taper near the upper end 52 as shown, that allows the inner bait container's eye 14 to freely slide over its full length and prevents the outer component from sliding beyond the taper transition point. As an alternative, the mounting rod 50 can have a hole 53 at the upper end that allows for a plastic or metal pin 54 to be inserted in order to hold the outer housing 11 of the device on the mounting rod, as shown in FIG. 6.

As before, the elastomeric band 32, which has an eye at one end, is attached to one end of the galvanic couple 33. The other end of the galvanic couple has another eye that is placed over the tube 15 as shown. The other end of the elastomeric band 32 is hooked over the tab 17. The elastomeric band 32 now effectively holds the inner bait container 20 and the outer housing 11 securely together.

FIG. 6 is a perspective view of the invention using the fixed mounting rod suspension with the bait container deployed. At this point, the galvanic couple 33 has corroded and released the elastomeric band 32. The pressure has equalized and the inner bait container 20 is free to deploy. At this point, the inner bait container 20 slides down the mounting rod, by its own weight, upon deployment while the outer housing 11 remains in place. At this point, the bait is fully exposed to seawater and attractant odors are released through the perforations 23 on the inner bait container 20 while still preventing sea lice and other organisms from having access to the bait.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A time-release bait canister comprising:

a) an outer housing, having an unbroken outer wall surface;
   b) an inner bait container, slidably engaged within said outer housing, said inner bait container having a plurality of openings formed therein, said inner bait container also having hemispherical cap thereon;
   c) a means for creating a watertight seal installed between said outer housing and said inner housing;
   d) a means for equalizing pressure between the inner bait container and an external environment, installed in said inner bait container; and
   e) a means for releasing the inner bait container on a time-release basis, attached to said bait canister to release the inner container from said outer housing after a defined interval, said means for releasing including:
      i) a post extending outwardly from said outer housing;
      ii) a tab also attached to said outer housing and extending outwardly therefrom, said tab being located longitudinally opposite of said post;
      iii) a galvanic couple, attached to said post and extending downwardly therefrom; and
      iv) an elastomeric band having two ends, the first end of said elastomeric band being connected to said tab and the second end being attached to said galvanic couple such that said elastomeric band extends over said hemispherical cap on said inner bait container and covers said means for equalizing pressure.

2. The time-release bait canister of claim 1 wherein the means for sealing comprise a rubber gasket.

3. The time-release bait canister of claim 1 wherein the means for equalizing pressure comprises a pressure equalization hole formed in said hemispherical cap of said inner bait container.

4. The time-release bait canister of claim 1 wherein said hemispherical cap further includes a channel formed in said hemispherical cap about said pressure equalization hole such that said elastomeric band is retained within said channel when said elastomeric band is attached for deployment.

5. The time-release bait canister of claim 1 further comprising a first ear attached to said hemispherical cap of said inner bait container and a second ear attached to said outer housing, said first and second ears being longitudinally disposed in alignment.

6. The time-release bait canister of claim 1 further comprising:

a) an eye formed on said hemispherical cap of said inner bait container; and
   b) a tube attached to said outer housing such that said eye and tube are longitudinally disposed in alignment.

7. The time-release bait canister of claim 1 wherein the outer housing and the inner bait container are constructed from plastic.

8. The time-release bait canister of claim 1 wherein the inner bait container and outer housing are generally cylindrical.

9. The time-release bait canister of claim 1 wherein each of the plurality of openings formed in said inner bait container is a hole 2 mm in diameter.

10. The time-release bait canister of claim 1 wherein each of the plurality of openings formed in said inner bait container is a slit 2 mm wide.

* * * * *